C. E. SKINNER.
SPEED COUNTER.
APPLICATION FILED JUNE 14, 1912.

1,214,088.

Patented Jan. 30, 1917.
2 SHEETS—SHEET 1.

WITNESSES:

INVENTOR
Charles E. Skinner
BY
Wesley G. Carr.
ATTORNEY

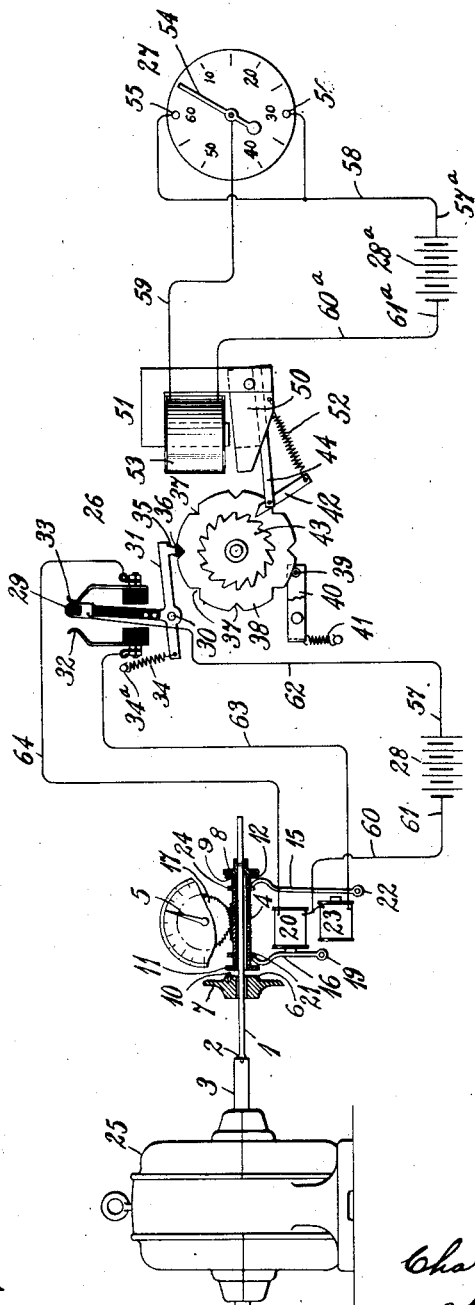

UNITED STATES PATENT OFFICE.

CHARLES E. SKINNER, OF WILKINSBURG, PENNSYLVANIA, ASSIGNOR TO WESTINGHOUSE ELECTRIC AND MANUFACTURING COMPANY, A CORPORATION OF PENNSYLVANIA.

SPEED-COUNTER.

1,214,088.  Specification of Letters Patent. Patented Jan. 30, 1917.

Application filed June 14, 1912. Serial No. 703,689.

*To all whom it may concern:*

Be it known that I, CHARLES E. SKINNER, a citizen of the United States, and a resident of Wilkinsburg, in the county of Allegheny and State of Pennsylvania, have invented a new and useful Improvement in Speed-Counters, of which the following is a specification.

My invention relates to means for determining the number of rotations of a shaft or other rotary object in a given time, and it has special reference to speed counters for ascertaining the number of rotations per minute of a rotating shaft.

The object of my invention is to provide a device of the class above indicated that shall be automatically started at the beginning and stopped at the end of a predetermined period of time.

A simple speed counter of a well known type comprises a shaft or spindle which is provided with a suitable point that is adapted to be placed in contact with the object the speed of which is to be determined in order to be rotated therewith, a graduated circular scale and a pointer which is geared to the spindle by some suitable reducing-gear mechanism. These instruments accurately count the speed of the object, while they are in contact with it, but considerable difficulty is experienced in bringing the point of the spindle into engagement with the rotating body and in disengaging it therefrom respectively at the beginning and the end of a minute or some other suitable unit of time.

According to my present invention, I provide a clutch between the pointer which is associated with the dial of the counter and the spindle and automatic means for so actuating the clutch as to start and stop the pointer in response to an electric clock or some other suitable horological device.

Figure 1:
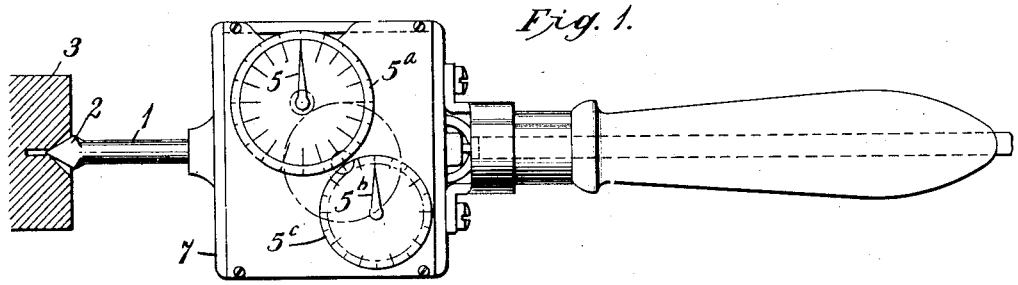
Figure 2:
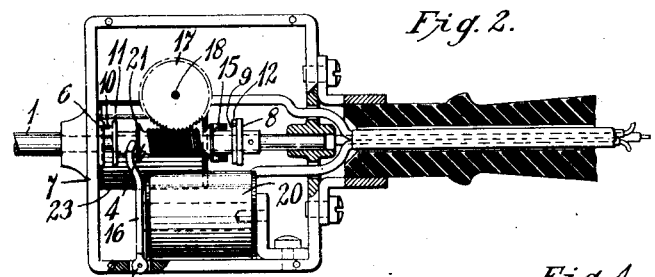
Figure 3:
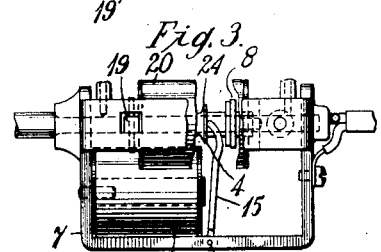
Figure 4:
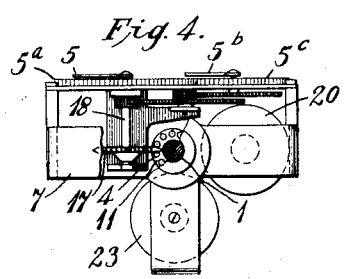
Figure 5:
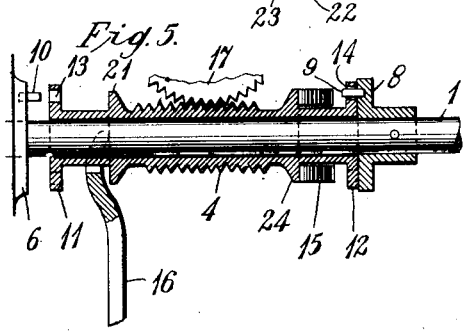
Figure 6:
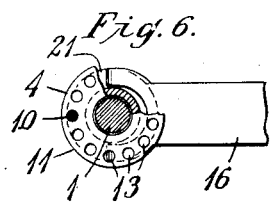

Figure 1 of the accompanying drawings is a plan view of a speed counter constructed in accordance with my invention. Fig. 2 is a partially sectional view corresponding to Fig. 1, with a portion of the casing removed. Fig. 3 is a side elevation, at right angles to Fig. 2, with a portion of the casing removed, and Fig. 4 is an end elevation, at right angles to Fig. 3. Figs. 5 and 6 are detail views, on a larger scale, of the clutch mechanism shown in Fig. 2. Fig. 7 is a diagrammatic view of a system embodying the speed counter of the other figures, a relay device for stopping and starting the counter, and a clock for governing the circuit of the relay device.

Referring to Figs. 1 to 6, inclusive, of the drawings, the counter here shown comprises a spindle 1, having a tip or head 2 which is adapted to engage the end of a shaft 3, or other rotating object, the speed of which is to be determined, a screw-threaded quill or sleeve 4, mounted on the spindle, a pointer or index finger 5, and suitable gearing between the sleeve 4 and the pointer.

The sleeve 4 is interposed between a boss 6 on a casing 7 of the counter, and a collar 8 which is secured to the spindle 1 and is provided with a pin 9 which projects toward the boss 6. The boss 6 is provided with a similar pin 10 which projects toward the collar 8. The ends of the sleeve 4 are respectively provided with flanges 11 and 12 having series of perforations 13 and 14 to receive the pins 10 and 9. The sleeve is adapted to slide on the spindle, in response to either one of a pair of actuating levers 15 and 16, into engagement with either the pin 9 or the pin 10, but the collar 8 is sufficiently spaced from the boss 6 to prevent any part of the sleeve being in contact with both pins at the same time. When the sleeve is adjusted into engagement with the pin 9, it is operatively connected to the spindle 1 and rotates with it, but when it is adjusted to its opposite position, the pin 10, which is a part of the stationary casing or frame of the counter, prevents the rotation of the sleeve. A notched wheel or gear 17 is secured to one end of a transverse shaft or pin 18, to the other end of which the pointer 5 is secured. The notched wheel or gear meshes with the screw-threaded surface of the sleeve 4 constituting a worm gear connection between the pin or shaft 18 and the spindle 1. The lever 16 is pivotally mounted at a point 19 on the casing or frame 7 and is constructed of magnetizable material so that it constitutes an armature of an electromagnet 20. When the coil of the electromagnet 20 is energized, the lever 16, which is bifurcated and acts on a flange 21 of the sleeve 4, adjusts the sleeve into the position shown in Fig. 5 of the drawings, in which it is operatively connected to the spindle 1. The lever 15 is pivoted at a point 22 in the frame or casing 7 and is also of magnetizable material constituting the armature of an electromagnet 23. The lever 15 is similar to the lever 16 in form and engages a flange 24 of the sleeve 4 but acts on the sleeve in the opposite direction, tending to disengage the flange 12 from the pin 9 and throw the flange 11 into engagement with the pin 10. The effect of first energizing the coil of the magnet 20 and, after a predetermined length of time, breaking the circuit to said coil and instantly energizing the coil of the magnet 23, is to connect the pointer or indicator 5 to the spindle 1 and then disconnect it therefrom.

A graduated circular dial 5ª is pivotally secured to the frame 7 of the counter, coaxially with the pointer 5 so that its zero mark may be set to correspond to the position of the pointer at starting. The adjustment of the dial is, however, opposed by sufficient friction to avoid its accidental displacement. The dial may, of course, be rigidly secured to the frame of the counter and the pointer pivotally secured to its supporting shaft, the arrangement corresponding to a well known connection between the hand of a clock and its spindle. Other means may be provided for easily bringing the pointer to a zero reading position relative to the dial preparatory to counting the number of rotations per minute of a rotating object within the spirit and scope of my invention.

The necessity of counting the revolutions of the pointer which, of course, are few relative to the rotations of the spindle 1, is avoided by providing a second dial 5ᶜ and a pointer 5ᵇ which coöperates therewith and is geared to the pointer 5 by some suitable reducing gearing, whereby the total number of rotations per minute of the spindle can be read directly from the two dials even if the device is used to ascertain the number of rotations per minute of a relatively high-speed object. For example: If the gear ratio between the pointers 5 and 5ᵇ is 20 to 1, and the pointer 5 makes one complete revolution for 100 rotations of the spindle 1, then the device can count directly from one to two thousand rotations of the spindle.

A spring may be substituted for one of the magnets 20 and 23, for actuating the sleeve 4 in one direction in opposition to the other magnet, but I prefer to use the arrangement illustrated.

One of the principal advantages of my speed counter over those of the prior art arises from the fact that the sleeve 4 is either clutched to a stationary part of the frame of the counter or to the spindle and, consequently, all of the parts may be made very light and the bearings as near frictionless as possible without danger of over-running. This is particularly important for determining the speed of rotation of relatively high speed machines, such as small electric motors. The usual hand counter is opposed by such a large amount of friction as to materially reduce the speed of a small motor under test by reason of the relatively large load which it imposes on the motor. Furthermore, it is necessary to force the spindle point of a hand counter against the rotating shaft with such pressure, in order to avoid slipping, as to produce a very undesirable end thrust in the bearings of the machine under test. None of these disadvantages appear in the structure of my present invention.

Referring to Fig. 7 of the drawings, the speed counter shown in the other figures is here shown diagrammatically with the spindle point engaging the end of the shaft 3 of an electric motor 25. In addition to the speed counter and the motor 25, the system shown embodies a relay switch 26, a horological device 27, and storage batteries 28 and 28ª which are intended to represent any suitable sources of electric energy. The relay switch 26 comprises a movable contact member 29 which is pivoted at a point 30 and is provided with a cross arm 31, and stationary contact members 32 and 33. A spring 34 is connected to one end of the cross arm 31 and is secured to a post 34ª which is so placed that the spring tends to throw the movable contact member 29 into engagement with the stationary contact member 33. The opposite end of the arm 31 has a pawl projection 35 which may be provided with a small roller 36 to engage any one of a plurality of notches 37 in the periphery of a cam 38. The depth of the notches 37 and the arrangement of parts are such that rotative movement of the cam moves the contact member 29 out of engagement with contact member 33 and into engagement with contact member 32 as the cam progresses the distance between adjacent notches.

The positions of the relay switch, in which contact is made between the parts 29 and 33, are accentuated by the engagement of roller 36 with notches 37, while the positions of engagement between the members 29 and 32 are accentuated by the engagement of a roller 39, carried by a pawl 40, with the notches 37. The pawl 40 is provided with a spring 41, in the usual manner, which holds the roller in engagement with the surface of the cam.

A ratchet wheel 43 is secured to the cam 38 and is periodically actuated by a pawl 42. The pawl 42 is pivotally supported at the outer end of an arm 44 which is secured to and forms a part of an armature 50 of an electromagnet 51. The pawl 42 is held against a stop by a spring 52 which is only placed under tension momentarily, as the armature 50 falls, when the coil 53 of the electromagnet 51 is deënergized. By periodically energizing the coil 53, the cam 38 is rotatively moved step-by-step in such manner as to make contact alternately between the member 29 and the members 33 and 32.

I prefer to employ an electric clock for the device 27 having a second hand 54 which engages stationary contact members 55 at the beginning and end of each minute and a contact member 56 at the end of the half minute.

The operation of the device is as follows: Assuming that the second hand 54 is actuated by an accurate clock mechanism and that the speed counter is in operation, the second hand 54 will, at the end of a half minute, engage the contact member 56, completing a circuit from a terminal 57$^a$ of the battery 28$^a$, through conductor 58, contact 56, second hand 54, conductor 59, coil 53 of magnet 51 and conductor 60$^a$ to the opposite terminal 61$^a$ of the battery. The magnet 51 being thus energized, raises the armature 50 and with it the arm 44 and pawl 42 to turn the cam 38 sufficiently to permit the roller 39 of the pawl 40 to engage one of the notches 37. In this position of the cam, the arm 31 is so moved as to throw the contact 29 into engagement with the contact 32, thus completing a circuit from a terminal 57 of the battery 28, through conductor 62, contacts 29 and 32, conductor 63, coil of magnet 23 and conductor 60 to battery terminal 61. Magnet 23, being thus energized, acts through lever 15 to move the sleeve 4 and release the pointer 5 from the spindle 1. The engagement of the second hand 54 with the contact 55 at the end of the minute again energizes the magnet coil 53 to effect such movement of the cam 38 as to permit the roller 36 to fall into one of the notches 37. The position of the relay switch contact 29 is, therefore, changed to the position shown in Fig. 7, and a circuit is completed from the conductor 62, through the contacts 29 and 33, the conductor 64, the magnet coil 20 and the conductor 60 to the battery terminal 61. The magnet 20, when energized, so adjusts the sleeve 4 as to operatively connect it to the spindle 1. It is thus evident that, at the beginning of each minute, the pointer 5 is operatively connected to the spindle 1 and at the end of the half minute the pointer 5 is instantly disconnected from the spindle 1 and is prevented from turning by pins 10. Therefore, by providing proper gear ratios, the number of revolutions counted, equals the number of revolutions per minute at which the shaft 3 is operating.

In order to make the reading particularly accurate it may be worth while to hold the counter in engagement with the shaft during several periods of time and average the readings. The batteries 28 and 28$^a$ may be replaced by a single source of energy if desired, although I believe two independent sources will usually be found preferable.

I believe that the variations in the speed of rotation of the shaft of the machine, even though the machine is supposed to be operating at a constant speed, will be greater than any error introduced by inaccuracies in the counter mechanism.

Variations in structure and in the circuit connections of the system may be effected within the sprit and scope of my invention, and I desire that only such limitations shall be imposed as are indicated in the appended claims.

I claim as my invention:

1. A speed counter comprising a rotatable member, an indicator, a clock-governed electromagnetic means for operatively connecting the indicator to the rotatable member at the beginning of a predetermined time interval and a second clock-governed electromagnetic means for disconnecting the rotatable member at the end of such time interval.

2. A speed counter comprising a rotatable spindle, an adjustable sleeve supported thereon, an indicator operatively connected to the sleeve, a clock-governed electromagnetic means for so adjusting the sleeve as to operatively connect it to the spindle at the beginning of a predetermined time interval and a second clock-governed electromagnetic means for disconnecting the sleeve from the spindle at the end of the predetermined time interval.

3. A speed counter comprising a rotatable spindle, an indicator, a clutch for operatively connecting the indicator to the spindle and disconnecting the same therefrom, a pair of electromagnets for actuating the clutch, and a time-governed controller for selectively and successively energizing the electromagnets.

4. A speed counter comprising a rotatable spindle, an indicator, a clutch for operatively connecting the indicator to the spindle and disconnecting the same therefrom, a pair of electro-responsive means for actuating the clutch, and a controller for governing one of the electro-responsive means to start the indicator at the beginning of a predetermined time interval and for governing the other electro-responsive means to stop the indicator at the end of such interval.

5. A speed counter comprising a rotatable spindle, an indicator, a clutch for operatively connecting the indicator to the spindle and disconnecting it therefrom, two electro-responsive means for selectively actuating the clutch, a clock mechanism, a controller for governing the electro-responsive means, and means dependent upon the clock mechanism for actuating the controller at the beginning and at the end of a predetermined time interval.

6. A speed counter comprising a rotatable spindle, an indicator, a clutch for operatively connecting the indicator to the spindle and disconnecting it therefrom, two electro-responsive means for selectively actuating the clutch, an electric clock, a controller for governing the electro-responsive means, and an actuating mechanism dependent upon the electric clock for changing the position of the controller at the beginning and end of a predetermined time interval.

7. A speed counter comprising a rotatable member, an indicator, electromagnetic means for operatively connecting the indicator to the rotatable member at the beginning of a predetermined time interval and a second electromagnetic means for disengaging the indicator from the rotatable member at the end of such time interval.

8. A speed counter comprising a rotatable spindle, an indicator, a worm screw loosely mounted on the spindle and having a clutch member thereon, a worm wheel operatively connected between the indicator and the worm screw, a clutch member mounted on the spindle, a clock-governed electromagnet for so moving the worm screw that the clutch member is adapted to engage, and a second clock-governed electromagnet for so moving the worm screw that the clutch members are adapted to disengage.

9. A speed counter comprising a rotatable spindle, an adjustable externally screw threaded sleeve supported thereon, a gear wheel adapted to engage the screw threaded sleeve, an indicator actuated by the gear wheel, and clock-governed electromagnetic means for so moving the sleeve along the spindle as to operatively connect it to the spindle at the beginning of a predetermined time interval and disconnect it therefrom at the end of such interval.

In testimony whereof, I have hereunto subscribed my name this 5th day of June, 1912.

CHARLES E. SKINNER.

Witnesses:
O. W. A. OETTING,
B. B. HINES.